US 8,422,731 B2

(12) United States Patent  
Gupta et al.

(10) Patent No.: US 8,422,731 B2  
(45) Date of Patent: Apr. 16, 2013

(54) SYSTEM, METHOD, AND APPARATUS FOR VIDEO FINGERPRINTING

(75) Inventors: Pawan Gupta, Bangalore (IN); P. Mahaboob Khan, Andhra Pradesh (IN); Smita Wadhwa, Haryana (IN)

(73) Assignee: Yahoo! Inc., Sunnyvale, CA (US)

( * ) Notice: Subject to any disclaimer, the term of this patent is extended or adjusted under 35 U.S.C. 154(b) by 960 days.

(21) Appl. No.: 12/208,186

(22) Filed: Sep. 10, 2008

(65) Prior Publication Data

US 2010/0061587 A1 Mar. 11, 2010

(51) Int. Cl.  
*G06K 9/00* (2006.01)

(52) U.S. Cl.  
USPC ........... 382/100; 382/165; 382/170; 382/218; 382/305; 386/252; 386/260; 380/201; 348/700

(58) Field of Classification Search .............. 382/100, 382/165, 170, 218, 305; 386/252, 260; 348/700  
See application file for complete search history.

(56) References Cited

U.S. PATENT DOCUMENTS

| | | | |
|---|---|---|---|
| 6,430,312 B1* | 8/2002 | Huang et al. | 382/165 |
| 6,535,620 B2* | 3/2003 | Wildes et al. | 382/107 |
| 6,549,245 B1* | 4/2003 | Lee et al. | 348/700 |
| 7,376,274 B2* | 5/2008 | Xiong | 382/218 |
| 2004/0197071 A1* | 10/2004 | Zhang et al. | 386/46 |
| 2006/0048191 A1* | 3/2006 | Xiong | 725/52 |
| 2006/0053080 A1* | 3/2006 | Edmonson et al. | 705/59 |
| 2006/0109902 A1* | 5/2006 | Yu et al. | 375/240.12 |
| 2009/0290752 A1* | 11/2009 | Kalva | 382/100 |
| 2009/0292701 A1* | 11/2009 | Saoudi et al. | 707/6 |

FOREIGN PATENT DOCUMENTS

EP 0436790 10/1990

OTHER PUBLICATIONS

Ngo, et al. "Video Partitioning by Temporal Slice Coherency." IEEE Transactions on Circuits and Systems for Video Technology. 11.8 (2001): 941-953.*

Cernekova, et al. "Shot Detection in Video Sequences Using Entropy-Based Metrics." Image Processing. 2002. Proceedings. 2002 International Conference on . 3. (2002): III-421-III-424.*

Kim, et al. "A Novel Approach to Scene Change Detection Using a Cross Entropy." Image Processing, 2000. Proceedings. 2000 International Conference on . 3. (2000): 937-940.*

Akutsu, et al. "Video Tomography: An Efficient Method for Camerawork Extraction and Motion Analysis." Multimedia '94 Proceedings of the second ACM international conference on Multimedia . (1994): 349-356.*

Pan, et al. "Visual Features Extraction Through Spatiotemporal Slice Analysis." MMM 2007, LCNS 4352. 4325. (2007): 304-313.*

Agarwala, et al. "Panoramic Video Textures." ACM Transactions on Graphics—Proceedings of ACM SIGGRAPH 2005. 24.3 (2005): 821-827.*

Ngo, et al. "Motion Analysis and Segmentation Through Spatio-Temporal Slices Processing." IEEE Transactions on Image Processing. 12.3 (2003): 341-355.*

Collins, Toby. "Analysing Video Sequences using the Spatio-temporal Volume." 2005. Web. <http://homepages.inf.ed.ac.uk/rbf/CVonline/LOCAL_COPIES/COLLINS/TobyCollins.pdf>.*

Andoni et al., "Near-Optimal Hashing Algorithms for Approximate Near(est) Neighbor Problem".

(Continued)

*Primary Examiner* — Michael A Newman (74) *Attorney, Agent, or Firm* — Berkeley Law & Technology Group, LLP (57) ABSTRACT

Embodiments of methods, apparatuses, devices and systems associated with video fingerprinting are disclosed.

37 Claims, 5 Drawing Sheets

OTHER PUBLICATIONS

Boreczky et al., "Comparison of Video Shot Boundary Detection Techniques", *Journal of Electronic Imaging* 5(2), 122-128, Apr. 1996.

Cheung et al., "Estimation of Web Multiplicity" in SPIE 2000.

Chiu et al., "A Time Warping Based Approach for Video Copy Detection", In Proceedings of the 18th International Conference on Pattern Recognition—vol. 03 (Aug. 20, 2006).

Fels et al., "Techniques for interactive video cubism", In Proceedings of ACM Multimedia, 2000.

Hua et al.,"Robust Video Signature Based on Ordinal measure", in ICIP 2004.

Huang et al., "Image Indexing Using Color Correlograms", *Proceedings of the 1997 Conference on Computer Vision and Pattern Recognition (CVPR '97)*.

Kd-tree—Wikipedia, the free encyclopedia, http://en.wikipedia.org/wiki/Kd-tree, accessed Jul. 7, 2008.

Law-To et al., "Robust Voting Algorithm Based on Labels of Behaviour for Video Copy Detection" in Santa Barbara, CA, ACM Oct. 2006.

Li et al., "Fast Video Shot Retrieval by Trace Geometry Matching in Principal Component Space".

Little et al. ,"A Digital On-Demand Video Service Supporting Content-Based Queries", Proc. ACM Multimedia 93, Anaheim, CA, Aug. 1993, pp. 427-436.

Liu et al., "Video Histogram: a Novel Video Signature for Efficient Web Video Duplicate Detection", yet to be published.

Liu et al., "On Real-Time Detecting Duplicate Web Videos", In Proceedings of *the International Conference on Acoustic, and Signal Processing* (ICASSP), Apr. 2007, Honolulu, Hawaii, USA.

Lu et al., "Hierarchical indexing structure for efficient similarity search in video retrieval", IEEE Transactions On Knowledge And Data Engineering, 18 11: 1544-1559. (Nov. 2006).

Mount et al., "ANN: A Library for Approximate Nearest Neighbor Searching", Version 1.1.1, Release Date: Aug. 4, 2006, http://www.cs.umd.edu/~mount/ANN/.

Ngo et al., "Fast Tracking of Near Duplicate KeyFrames in Broadcast Domain with Transitivity Propagation" in Santa Barbara, CA, ACM Oct. 2006.

Rowe et al., "Indexes for User Access to Large Video Databases", in *Storage and Retrieval for Image and Video Databases II, Symp. On Elec. Imaging Sci. & Tech.*, Wayne Niblack, Ramesh C. Jain, Editors, Proc. SPIE 2185, San Jose, CA, Feb. 1994, pp. 150-161.

Shen et al., "Towards Effective Indexing for Very Large Sequence Database" in ACM, Baltimore, Maryland, Jun. 2005.

Zabih et al., "A Feature-Based Algorithm for Detecting and Classifying Scene Breaks", Proc. ACM Multimedia 95, San Francisco, CA, Nov. 1993, pp. 189-200.

Zhao et al., "Content-based Retrieval of Video Shot Using the Improved Nearest Feature Line Method", in 2001 IEEE.

\* cited by examiner

SYSTEM, METHOD, AND APPARATUS FOR VIDEO FINGERPRINTING

FIELD

Embodiments relate to the field of video, and more specifically, to video fingerprinting.

BACKGROUND

The World Wide Web provides access to a vast amount of information, including video files. Web sites allow users to view and, under some circumstances, share video files, such as by posting video files for other users to view. Due to the vast amount of information available, processes for identifying similar videos may be desirable. Given the large quantity of videos that may be made available on various web sites, it may be desirable for web site operators to be able to identify if one or more video files correspond to one or more other video files.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, procedures, components or circuits that would be known by one of ordinary skill have not been described in detail so as not to obscure claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Video fingerprinting as used herein may refer to a process, system, or method for generating one or more identifiers associated with one or more video files. For example, a video fingerprint may comprise a unique identifier associated with a video file. In an embodiment, the unique identifier may, under some circumstances be used to compare one or more video files. For example, a video fingerprint may be useful at least in part to identify copyright violation or copyright monetization in a system having user generated content. For example, in a system where a user can upload video content, video fingerprinting may be useful to identify situations where a user has violated a third party's copyright with the uploaded content. In this example, if a user has improperly incorporated a copyrighted work into uploaded content, a video fingerprint may help to identify the source of the copyrighted work, which may aid in disabling access to user content that improperly incorporates copyrighted works. In addition, video fingerprinting may be useful for detecting copyrighted works for other purposes, such as for tracking and distributing royalties for licensed works. In addition, video fingerprinting may be useful for identifying duplicate content. In this example, video files may, under some circumstances involve significant amounts of storage. At least in part by reducing duplicate content a system or process may be able to improve performance or cost by reducing the amount storage for saved content. In addition, video fingerprinting may be useful in improving video search engine results, for example, such as by presenting more relevant searches earlier or by identifying alternate copies of video content. Furthermore, search results with similar video fingerprints may be grouped together for presentation to a searcher. It should, however, be noted that these are merely examples relating to video fingerprinting and that claimed subject matter is not limited in this regard.

Video matching, may, under some circumstances, involve a number of potential solutions. One potential solution involves extracting one or more types of data from one or more videos and comparing the extracted data. Examples of types of extracted data include, but are in no way limited to, metadata, color data, region data, temporal order data, audio data, motion data, time data, object recognition data, video sequence data, shot boundary data, shot clustering data, subsampled shot data, ordinal shot data, or color histograms relating to one or more key frames, to name but a few examples. In one example, one or more videos may, under some circumstances, be matched based at least in part on extracted metadata, such as manually or machine generated information relating to content of a video. However, this data may be different for similar videos depending at least in part on how the videos or the data itself were produced, which may under some circumstances reduce the likelihood of similar videos being matched using this data.

For another example, one or more videos may, under some circumstances be matched based at least in part on extracted color data. Furthermore, in this example, extracted color data may comprise a variety of data including, but in no way limited to color histograms, region histograms, color coherence vectors (CCVs), and ordinal signatures, to name but a few examples. For example, a color histogram associated with a video may be based at least in part on color data extracted from one or more frames of a video. One or more videos may be compared based at least in part on their respective color histograms, for example. In this example, a difference between one or more color histograms may be used to compare one or more videos. Furthermore, one or more color histograms may be categorized into one or more bins based at least in part on luminance values associated with the histograms. For example, a color histograms with 32 luminance bins and 16 bins for each chrominance channel may be computed for one or more frames of one or more videos, such as one or more videos that may be compared. In this example, a first and second video may be determined to be matches if a comparison of their respective color histograms achieves a threshold value. On the other hand, areas of the videos that do not achieve a threshold value may be determined not to be matches. Some circumstances, such as one of the videos having a degraded quality, may at least in part contribute to videos being determined not to match that, under other circumstances, would have been determined to match.

In addition, a variety of approaches may be implemented with regard to how much of one or more videos are compared. For example, extracted features may be compared for all frames of a video, key frames of a video, sub-sampled frames of a video, or combinations thereof. For example, if extracted features for all frames of a video are compared, the comparison, while under some circumstances effective, may be computationally expensive. For another example, if extracted features from key frames are compared, the comparison may under some circumstances, such as lower quality videos with poor shot boundaries or few potential key frames, be of limited effectiveness. While comparing extracted features of sub-sampled frames may improve performance of video matching, it may, under some circumstances, be computationally expensive due at least in part to the number of frames that are sub-sampled for feature extraction and comparison.

One or more of the forthcoming embodiments may address one or more of the above described challenges.

In an embodiment, a video file may be treated as a three dimensional shape, such as a cube of varying lengths for example. For example, the dimensions of the shape may comprise horizontal, vertical, and time. In an embodiment, a video file may be separated into one or more video cubes, such as by dividing the video file at one or more shot boundaries, as described more fully below, for example. As used herein, a "video cube" may refer to a three dimensional representation of a portion of a video file. In an embodiment, a slice across multiple frames, such as a diagonal slice may be taken from the one or more video cubes.

In an embodiment, a feature vector, or video fingerprint, may be formed based at least in part on the slice across multiple frames. The video fingerprints may then be stored or indexed for future use, such as in matching one or more videos corresponding to the video fingerprints, for example. As used herein, a "video fingerprint" or "video signature" may refer to one or more extracted features from a video file or video cube that, under some circumstances, may be used to identify a video file or video cube. Furthermore, the terms video fingerprint and video signature may be used interchangeably throughout this document. In an embodiment, a video fingerprint may comprise a representation of one or more features extracted from a video file. For example, a video fingerprint may comprise a representation of one or more features extracted from the slice across multiple frames of a video cube or video file. It should be noted that although described, at times, in terms of a diagonal slice, claimed subject matter is not limited to diagonal slices and that other shapes may be used for generating a slice across multiple frames of a video file or video cube. In addition, it should be noted that the slice across multiple frames need not include information from every frame of the video file or cube. In an embodiment, the extracted features may comprise color and luminance, for example. It should, however, be noted that this is merely an example relating to extracted features and that claimed subject matter is not limited to this example.

Unless specifically stated otherwise, as apparent from the following discussion, it is appreciated that throughout this specification discussions utilizing terms such as "processing," "computing," "calculating," "selecting," "forming," "enabling," "extracting," "inhibiting," "identifying," "comparing," "representing," "modifying," "receiving," "transmitting," "storing," "authenticating," "authorizing," "determining," "slicing," "hashing," "generating" or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Figure 1:
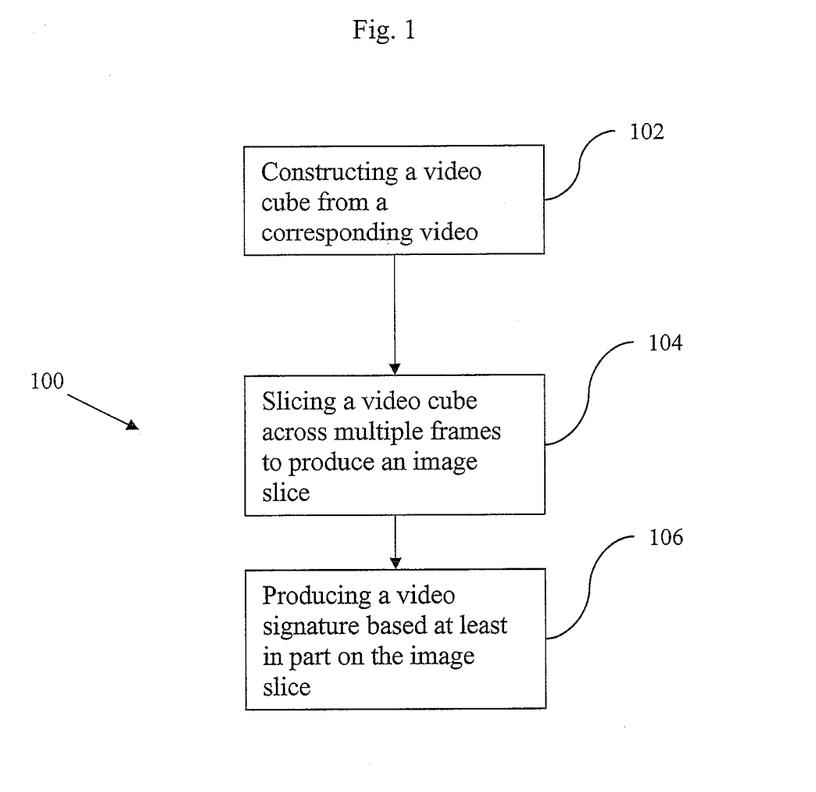
FIG. 1 is a flowchart of a method or process for generating video fingerprints in accordance with an embodiment.
Figure 2:
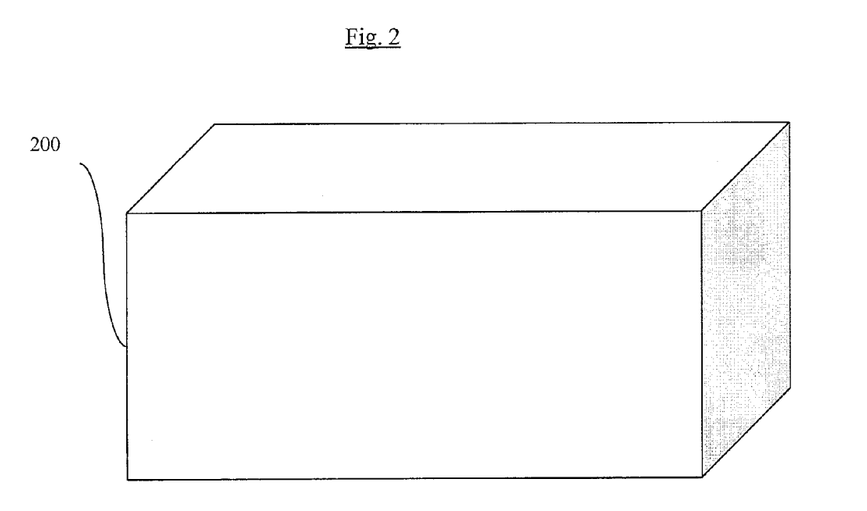
FIG. 2 is a schematic diagram of a representation of a video file in accordance with an embodiment.
Figure 3:
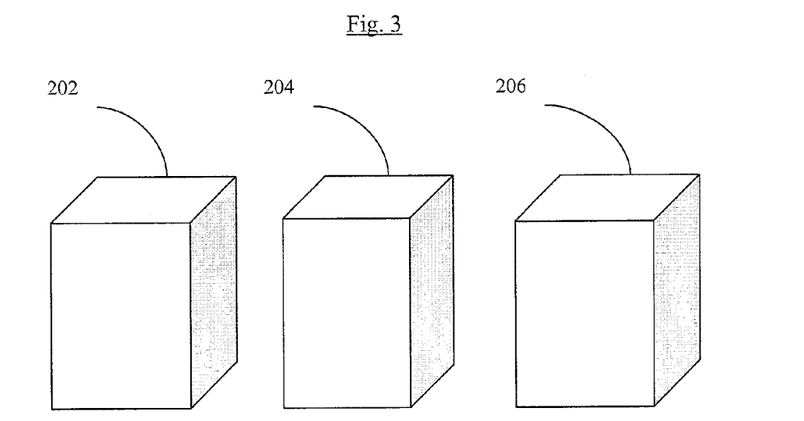
FIG. 3 is a schematic diagram of one or more video cubes formed from the video file in accordance with an embodiment.

FIG. 1 is a flow chart of a method or process in accordance with an embodiment 100. With regard to box 102, a system, apparatus, or process may construct one or more video cubes from a corresponding video. For example, a process, apparatus, or system may represent a video as a three dimensional object, such as an object having a height, a width, and a time component. In this example, the three dimensional object may comprise one or more frames from a video file arranged, such as sequentially, along a time axis. In an embodiment, a process, apparatus, or system may determine one or more shot boundaries within the video. For example, a system, apparatus, or process may employ a shot boundary detection process, such as a process for implementing Frederic Dufaux's process. For another example, a system, apparatus, or process may employ a different shot boundary detection process, such as a color histogram process, or an edge change ratio process. As just one further example, a discussion of shot boundary detection techniques may be found in the article "Comparison of video shot boundary detection techniques" by John S. Boreczky and Lawrence A. Rowe, J. Electron. Imaging, Vol. 5, 122 (1996). In an embodiment, a system, apparatus, or process may calculate an entropy histogram corresponding to respective frames from the video. In addition, a system, apparatus, or process may calculate a cumulative temporal entropy histogram, based at least in part on the calculated entropy histograms, at least in part to identify one or more times in a video if changes in respective entropy histograms appear to indicate that a shot boundary has been identified. For example, in a least one embodiment a measure of spatial activity may computed for a frame based at least in part on a calculated entropy histogram. In an embodiment, entropy for a particular frame may be calculated based at least in part on the following:

$$H(k) = -x \Sigma p(x,k) \log 2 (p(x,k))$$

In this embodiment, p(x, k) comprises probability of a gray-level value x in a luminance histogram of a particular frame k. For example, a high value of entropy may indicate a frame with a relatively high spatial content. In an embodiment, a frame with a relatively high spatial content may tend to have a flat histogram at least in part due to having a pixel luminance that is spread out amongst a relatively large number of possible pixel luminance values. In another example, a frame with a relatively low spatial content may tend to have a histogram in which a luminance of a relatively large number of pixels may center around substantially similar luminance value. In this example, a histogram corresponding to the frame may have a peak value, which may indicate a relatively low entropy value, for example. For an example, a frame including a boat in a lake on a cloudless day may tend to have a histogram with a relatively large quantity of pixels centering around a color blue. It should, however, be noted that these are merely examples relating to shot boundary detection and entropy values and that claimed subject matter is not limited in this regard. Under some circumstances, such as if shot boundaries correspond to somewhat smaller than desirable video cubes, it may be desirable to merge one or more video cubes prior to proceeding in embodiment 100, for example. For example, a video cube having a time component of less than a certain duration, such as 5 to 10 seconds, as an example may comprise a candidate for merging with one or more other video cubes. It should, however, be noted that this is merely an illustrative example relating to video cube formation and that claimed subject matter is not limited in this regard.

With regard to box 104, a system, apparatus, or process may slice one or more one the video cubes across multiple frames, such as by diagonally slicing the one or more video cubes, to produce one or more corresponding image slices. In an embodiment, a diagonal slice may comprise a slice between two vertices of a video cube, as shown in more detail below with regard to FIGS. 4 and 5. For example, a diagonal slice may begin at a top height of a video cube at a beginning time of the video cube along a time axis and extend to a lower height of the video cube at an ending time of the video cube along the time axis. In this manner, a diagonal slice may include information taken from across multiple frames along a height axis and a width axis while also including information with respect to the video cube along a time axis. In an embodiment, including information from multiple frames, such as along a time axis, may improve performance of one or more matching processes describe more fully below.

With regard to box 106, a system, apparatus, or process may produce a video signature or fingerprint based at least in part on an image slice. For example, one or more aspects of an image slice may be extracted at least in part to form a video signature or fingerprint corresponding to a video cube from which the image slice was formed. In an embodiment, one or more extracted aspects of an image may comprise color, luminance, texture, shape, contrast, motion, object recognition, or a variety of other features. In one particular embodiment, a color correlogram may be formed based at least in part on an image slice. As used herein, a color correlogram may refer to a table or matrix including color information and distance information. For example, a matrix entry, such as $C(i, j)$, may correspond to a number of pixels of a color i at a pixel distance d for a particular color j. For example, other extracted features may include color moment data, a layout histogram, a texture histogram, edge texture data, Blob data, or corner detection data, metadata, color data, region data, temporal order data, audio data, motion data, time data, object recognition data, video sequence data, shot boundary data, shot clustering data, sub-sampled shot data, ordinal shot data, or color histograms relating to one or more key frames, to name but a few examples. It should, however, be noted that this are merely illustrative examples relating to a video signature or fingerprint and that claimed subject matter is not limited in this regard.

FIGS. 2-5 are schematic diagrams of a representation of a video file 200, along with one or more video cubes formed from video file 200, and a diagonal slice on one of the video cubes in accordance with an embodiment. With regard to FIG. 2, video file 200 may be represented as a three dimensional object having a height, a width, and a time dimension. For example, one or more frames of a video file may be represented as a sequence of frames along a time axis, thus forming a three dimensional representation of the video file. With regard to FIG. 3, video file 200 may be separated into one or more video cubes, such as video cubes 202, 204, and 206, for example. As discussed above, video file 200 may be formed into one or more video cubes based at least in part on one or more detected shot boundaries within video file 200. For example, a shot boundary detection process may be utilized, in conjunction with video file 200, to determine one or more shot boundaries within video file 200. In an embodiment, a system or process may calculate an entropy histogram corresponding to one or more frames within video file 200. In this embodiment, a system of process may further calculate a temporal entropy histogram based at least in part the calculated entropy histograms corresponding to the one or more frames. For example, if the temporal entropy histogram shows a change having a threshold value at a particular time, a shot boundary detection process may determine that the particular time corresponds to a shot boundary. For example, a calculated entropy histogram value on the order of 30.0 may indicate that a shot boundary has been detected. Alternatively, for example, a shot boundary may be determined based at least in part on a threshold number or range of frames, such as 20 to 40 frames, with a calculated temporal histogram on the order of 6. Furthermore, as discussed above, a system, apparatus, or process may, under some circumstances, merge one or more video cubes formed based at least in part on detected shot boundaries. For example, if a one or more video cubes formed along detected shot boundaries are below a threshold length, such as 5 to 10 second, those video cubes may be merged for further processing or analysis, as discussed above.

Figure 4:
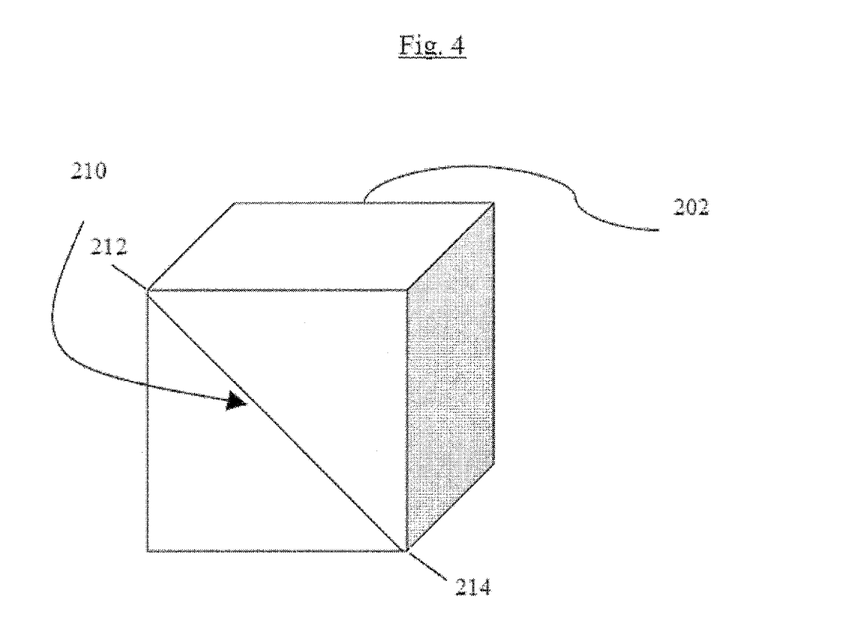
FIG. 4 is a schematic diagram of one of the video cubes with a slice across multiple frames in accordance with an embodiment.

With regard to FIG. 4, a system, apparatus, or process may slice a video cube, such as video cube 202, across multiple frames, at least in part to form an image slice 210 corresponding to video cube 202. In an embodiment, a slice across multiple frames may comprise a diagonal slice. However, it should be noted that a wide variety of slice shapes may be used, and claimed subject matter is not limited to any particular shape. In an embodiment, a diagonal slice may comprise one or more pixels extracted from video cube 202 along a diagonal line, as shown in FIG. 4. For example, a diagonal slice may be formed based at least in part on one or more pixels along a diagonal plane of a video cube. In this example, a diagonal plane of a video cube may begin at a height 212 at time T1 and end at a height 214 at a time T2. In this particular example, times T1 and T2 correspond to a beginning time and an ending time of video cube 202, though it should be noted that other times within video cube 202 may likewise be used. It should also be noted that other heights within video cube 202 may also be used, and that, accordingly, claimed subject matter is not limited in this regard. It should further be noted, again, that a slice across multiple frames may take a variety of shapes and that claimed subject matter is not limited to any particular shape.

Figure 5:
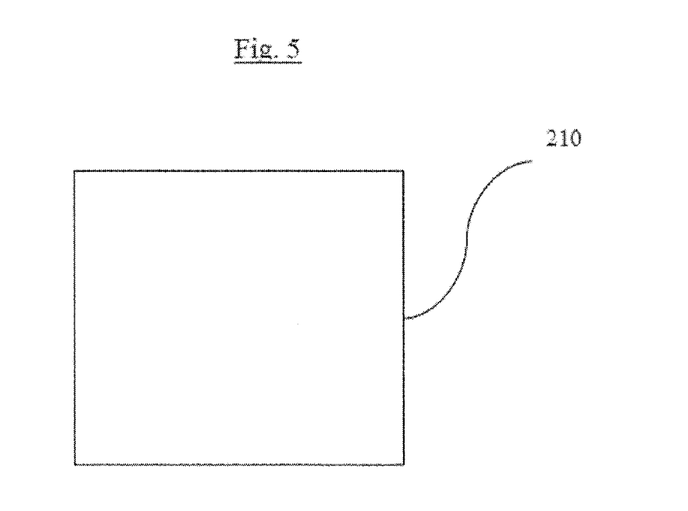
FIG. 5 is a schematic diagram of the slice of one of the video cubes in accordance with an embodiment.

With regard to FIG. 5, diagonal slice 210 may be represented as an image slice formed based at least in part on video cube 202. For example, diagonal slice 210 may comprise one or more pixels extracted from video cube 202. In this example, respective pixels may have a number of properties including, but in no way limited to, color, brightness, hue, horizontal position, vertical position, and time, for example. In an embodiment, a system, apparatus, or process may form a video signature or fingerprint based at least in part on one or more aspects of the image slice. For example, a system or process may extract data relating to horizontal position, vertical position, color, brightness, hue, and time from the image slice. In an embodiment, the extracted data may be represented in a matrix, as discussed above, as a video fingerprint corresponding to video cube 202. For example, the extracted data may comprise a color correlogram, as described above, and may be represented by a matrix.

Furthermore, the video fingerprints may be stored in one or more indexes. For example, the video fingerprints may be subjected to Local Sensitivity Hashing (LSH) function or process, at least in part for subsequent Approximate Nearest Neighbor (ANN) searching. The LSH function or process may be operable to map one or more received values, such as one or more video fingerprints, to a smaller number of values with a desirable degree of probability that the similar ones of the one or more received values will be mapped to a same one of the smaller number or values, for example. In at least one embodiment, a group of one or more hashing functions H may be chosen so that the hashing functions H coupled with a probability distribution D over hashing functions H such that the equation $$h \in H$$

satisfies the following equation $$Pr_{h \in H}[h(a)=h(b)] = \phi(a,b)$$

for a plurality of $$a, b \in U.$$

Figure 6:
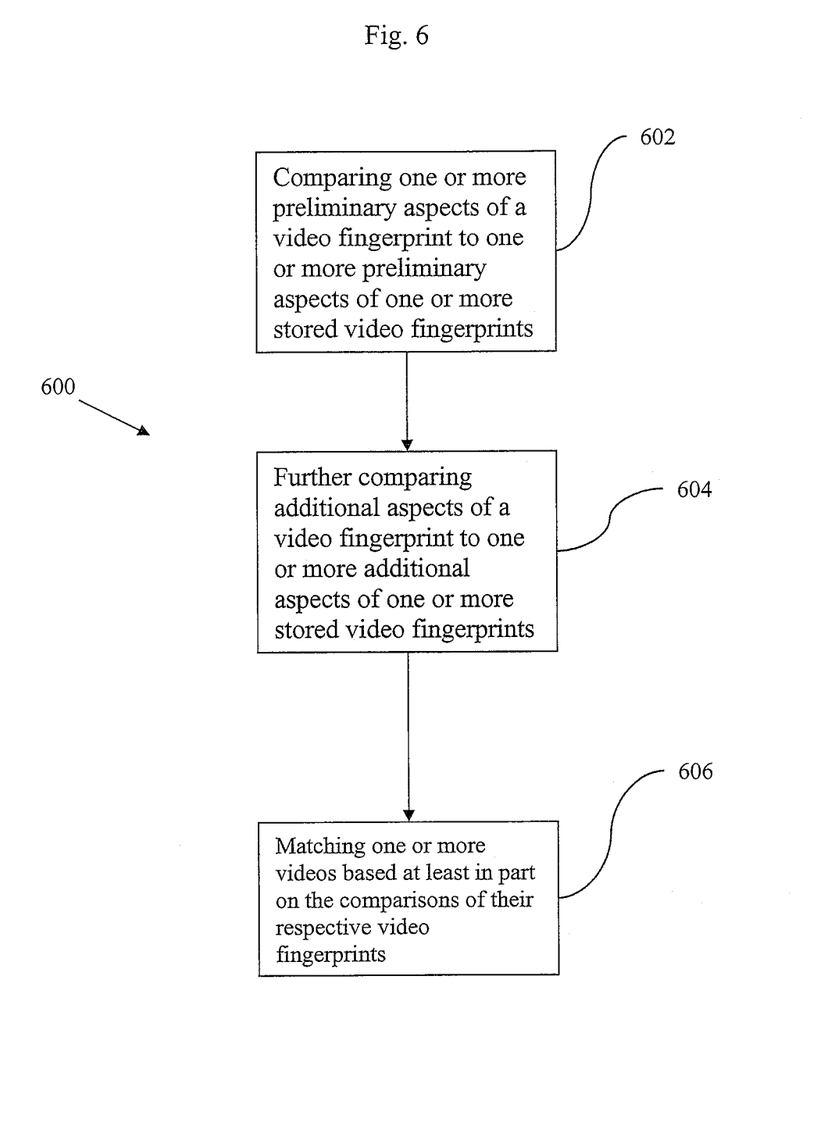
FIG. 6 is a flowchart of a method or process for matching video files in accordance with an embodiment.

Additional examples relating to LSH, ANN, k-dtrees and the like may be found in the paper "Near-Optimal Hashing Algorithms for Approximate Near(est) Neighbor Problem" by Piotr Indyk et al, available at http://people.csail.mit.edu/indyk/mmds.pdf With regard to FIG. 6, a candidate video may be received by a video matching system, apparatus or process, as discussed below with regard to FIG. 7. For example, a user may upload a video file to a web site, such as a file or video sharing web site. In this example, an uploaded video may be represented as a three dimensional shape having a height, a width, and a time dimension. Similar to the process discussed above with regard to FIGS. 1-5, an uploaded video may be separated into one or more video cubes. For example, one or more video cubes may be formed based at least in part on one or more detected shot boundaries, as discussed above. As discussed above, a slice across multiple frames, such as a diagonal slice, may be taken from one or more of the formed video cubes. Furthermore, a video fingerprint, such as a color correlogram may be determined based at least in part on the diagonal slices. In an embodiment, the video fingerprint may be compared to one or more previously obtained video fingerprints. For example, one or more previously obtained video fingerprints may have previously been stored. In this example, the one or more previously obtained video fingerprints may have been operated on by one or more hash functions, as described above, prior to storage. The hashed video fingerprints may be stored in a data structure for subsequent look-up. For example, the hashed video fingerprints may be stored in a k-dimensional data structure, such as a k-dimensional tree, at least in part to facilitate identifying similar hashed fingerprints, wherein K could be any positive integer. For example, a k-dimensional tree may comprise a space-partitioning data structure at least in part for organizing a k-dimensional data space. In this example, a stored video fingerprint may be represented as a node within a k-dimensional tree structure. As just one example, a tree structure is shown in EPO Publication No. EP0436790 entitled "Multi-dimensional tree structure for the spatial sorting of geometric objects" of Rajan et al. It should be noted, however, that embodiments of video fingerprints in accordance with claimed subject matter may be stored or compared without having been operated on by one or more hash functions, may be stored other than as a data structure, or may be stored in data structures other than k-dimensional trees. Therefore, claimed subject matter is not limited in these respects.

With regard to box 602, the video fingerprint from the uploaded video may be compared to one or more previously stored video fingerprints. For example, one or more preliminary aspects of the video fingerprint from the uploaded video may be compared to one or more preliminary aspects of one or more previously stored video fingerprints, at least in part to identify one or more possibly matching video fingerprints. For example, a color correlogram from uploaded video may be added to a k-dimensional tree representation of previously stored color correlograms. In this example, a desirable number of neighbors for a color correlogram from uploaded video in the k-dimensional tree of color correlograms may be identified using Approximate Nearest Neighbor Searching. In this example, an identified desirable number of neighbor color correlograms may be identified as possible matching video fingerprints for further analysis. With regard to box 604, once one or more possibly matching video fingerprints are identified, a more detailed comparison of further aspects of the video fingerprints may proceed, such as comparing one or more luminance or color correlograms corresponding to one or more possibly matching videos. For example, the video fingerprint from the uploaded video may be compared to additional aspects of the identified possibly matching video fingerprints. With regard to box 606, the uploaded video may be matched to one or more other videos based at least in part on the above comparisons of the video fingerprint from the uploaded video to previously stored video fingerprints.

Figure 7:
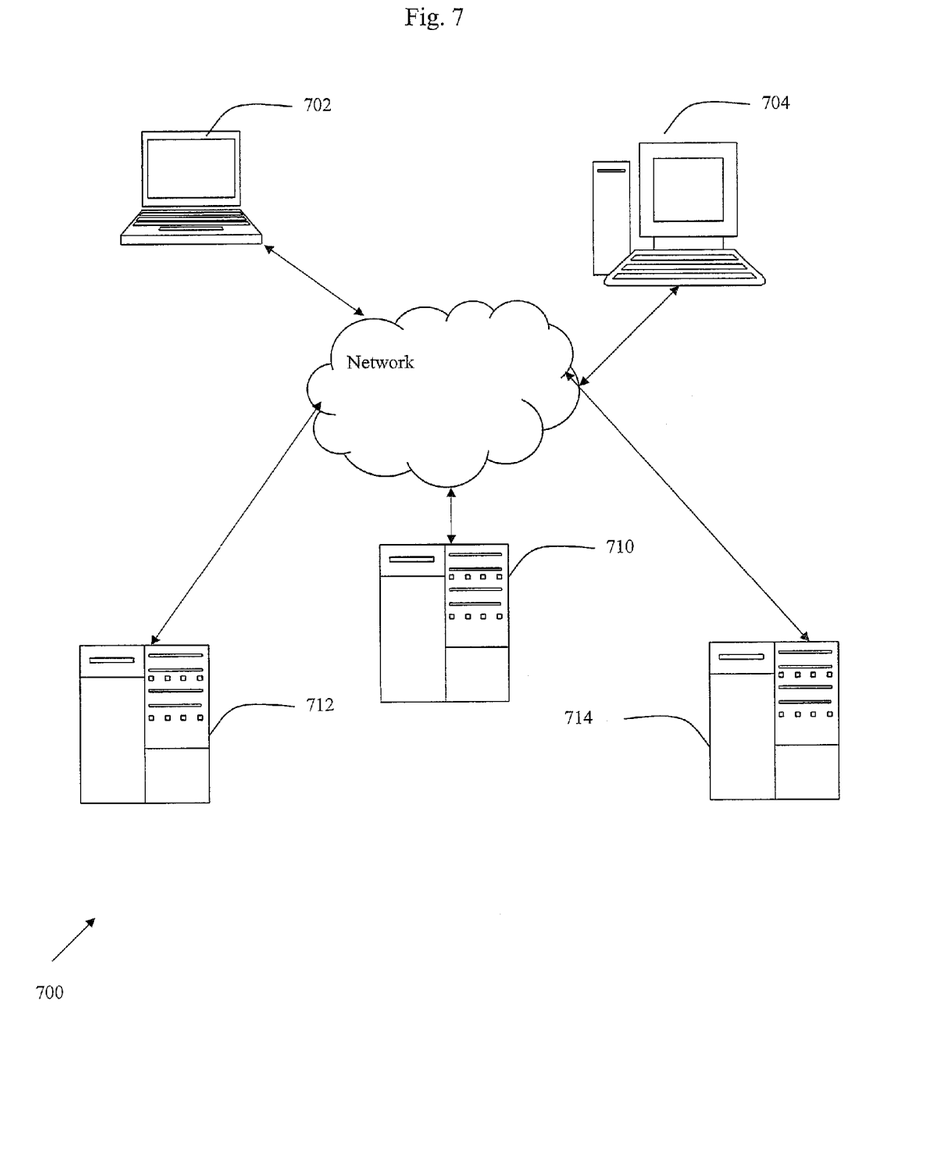
FIG. 7 is a schematic diagram of a system in accordance with an embodiment.

FIG. 7 is a schematic diagram of a system 700 in accordance with an embodiment. With regard to FIG. 7, a user may upload a video file, such as by using computing platforms 702 or 704 in conjunction with an application program or interface, such as a web browser, for example. The uploaded video may be transmitted via a network to computing platform 710. Computing platform 710 may, under some circumstances, transmit the uploaded video to computing platform 712. In an embodiment, computing platform 712 may, as described above, form one or more video cubes from the uploaded video file. In this embodiment, the video cubes may be formed based at least in part on one or more identified shot boundaries, as described above. Furthermore, computing platform 712 may, as described above, create a diagonal slice from the one or more video cubes. In an embodiment, computing platform 712 may further extract one or more features from the diagonal slices to form one or more video fingerprints. For example, computing platform 712 may form a color correlogram from the diagonal slices. In an embodiment, computing platform 712 may transmit the extracted color correlograms to computing platform 714. Computing platform 714 may operate on the transmitted color correlograms with one or more hash functions, such as the LCH discussed above. In an embodiment, computing platform 714 may compare one or more preliminary aspects of the hashed color correlograms to one or more stored hashed video fingerprints, at least in part to identify one or more possible matching video files. Computing platform 714 may then compare one or more additional aspects of the hashed color correlograms to one or more additional aspects of the one or more stored hashed video fingerprints corresponding to the one or more possible matching video files. Based at least in part on these comparisons, computing platform 714 may match the uploaded video file to one or more video files. In an embodiment, computing platform 714 may transmit the results of the comparisons and matching to computing platform 710. In an embodiment, computing platform 710 may perform a variety of tasks based at least in part on the matching information. For example, if the matching operation determines that the uploaded video file does not match any other videos computing platform 710 may allow the uploaded video to be posted to a web site, such as a file sharing web site. In another example if the matching operation determines that the uploaded video file does match one or more other video files, computing platform 710 may block the uploaded video file from being posted to a web site. Alternatively, computing platform 710 may mark the uploaded video file as being a duplicate file. As yet another alternative, computing platform 710 may update a licensing or royalty file to reflect that a licensed video has been posted so that a party owning one or more rights in a copyrighted work may be properly compensated. It should, of course, be noted that these are merely illustrative examples relating to matching video files and that claimed subject matter is not limited in this regard.

In the preceding description, various aspects of claimed subject matter have been described. For purposes of explanation, specific numbers, systems or configurations were set forth to provide a thorough understanding of the claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method comprising:
identifying one or more shot boundaries in a source video comprised of multiple frames, wherein said one or more shot boundaries are identified based at least in part on a determination that a entropy histogram for one or more particular frames of said multiple frames has a value greater than a threshold entropy value;
slicing a video cube across said multiple frames to produce an image slice, wherein said one or more shot boundaries forms at least one edge of said video cube, said video cube comprising a time axis, where said image slice has a first pixel height at a first time on the time axis and a second pixel height at a second time on the time axis, said first pixel height being different from the second pixel height; and
producing a video signature based at least in part on said image slice.

2. The method of claim 1, wherein slicing a video cube across multiple frames comprises diagonally slicing a video cube.

3. The method of claim 2, wherein said video signature corresponds to said source video.

4. The method of claim 3, and further comprising:
repeatedly applying said constructing, slicing and producing to a plurality of videos to form a plurality of corresponding video signatures.

5. The method of claim 4, and further comprising:
matching said plurality of videos based at least in part on said plurality of video signatures.

6. The method of claim 5, and further comprising:
blocking one or more videos from distribution based at least in part on said matching.

7. The method of claim 5, and further comprising:
licensing one or more videos based at least in part on said matching.

8. The method of claim 1, wherein said producing a video signature based at least in part on said image slice comprises generating a feature vector based at least in part on said image slice.

9. The method of claim 8, wherein said feature vector comprises a color correlogram based at least in part on said image slice.

10. The method of claim 1, wherein identifying one or more shot boundaries further comprises calculating an accumulated temporal histogram based at least in part on one or more entropy histograms.

11. An article comprising: a non-transitory storage medium having instructions stored thereon executable by a computing platform to:
identify one or more shot boundaries in a source video comprised of multiple frames, wherein said one or more shot boundaries are identified based at least in part on a determination that a entropy histogram for one or more particular frames of said multiple frames has a value greater than a threshold entropy value;
slice a video cube across said multiple frames to produce an image slice, wherein said one or more shot boundaries forms at least one edge of said video cube, said video cube comprising a time axis, where said image slice has a first pixel height at a first time on the time axis and a second pixel height at a second time on the time axis, said first pixel height being different from the second pixel height; and
produce a video signature based at least in part on said image slice.

12. The article of claim 11, wherein said instructions are further executable by said computing platform to slice a video cube across multiple frames by diagonally slicing said video cube.

13. The article of claim 12, wherein said video signature corresponds to said source video.

14. The article of claim 13, wherein said instructions are further executable by said computing platform to form a plurality of video signatures by repeatedly applying the constructing, slicing and producing to a plurality of videos.

15. The article of claim 14, wherein said instructions are further executable by said computing platform to match said plurality of videos based at least in part on said plurality of video signatures.

16. The article of claim 11, wherein said instructions are further executable by said computing platform to produce a video signature based at least in part on said image slice at least in part by generating a feature vector based at least in part on said image slice.

17. The article of claim 16, wherein said feature vector comprises a color correlogram based at least in part on said image slice.

18. The article of claim 11, wherein said instructions are further executable by said computing platform to identify said one or more shot boundaries at least in part by calculating an accumulated temporal histogram based at least in part on one or more entropy histograms.

19. An apparatus comprising:
a computing platform to:
identify one or more shot boundaries in a source video comprised of multiple frames, wherein said one or more shot boundaries are identified based at least in part on a determination that a entropy histogram for one or more particular frames of said multiple frames has a value greater than a threshold entropy value;
slice a video cube across said multiple frames to produce an image slice, wherein said one or more shot boundaries forms at least one edge of said video cube, said video cube comprising a time axis, where said image slice has a first pixel height at a first time on the time axis and a second pixel height at a second time on the time axis said first pixel height being different from the second pixel height; and
said computing platform further adapted to produce a video signature based at least in part on said image slice.

20. The apparatus of claim 19, wherein said computing platform is further capable of slicing a video cube across multiple frames by diagonally slicing said video cube.

21. The apparatus of claim 20, wherein said video signature corresponds to said source video.

22. The apparatus of claim 21, wherein said computing platform is further capable of forming a plurality of video signatures by repeatedly applying the constructing, slicing and producing to a plurality of videos.

23. The apparatus of claim 22, wherein said computing platform is further capable of matching said plurality of videos based at least in part on said plurality of video signatures.

24. The apparatus of claim 19, wherein said computing platform is further capable of producing a video signature based at least in part on said image slice at least in part by generating a feature vector based at least in part on said image slice.

25. The apparatus of claim 24, wherein said feature vector comprises a color correlogram based at least in part on said image slice.

26. The apparatus of claim 19, wherein said computing platform is further capable of identifying said one or more shot boundaries at least in part by calculating an accumulated temporal histogram based at least in part on one or more entropy histograms.

27. A method comprising:
matching one or more videos based at least in part on respective video fingerprints;
wherein said video fingerprint is produced based at least in part on an image slice;
wherein said image slice is produced based at least in part on a slice across multiple frames of a video cube, and one or more shot boundaries forms at least one edge of said video cube, said video cube comprising a time axis, where said image slice has a first pixel height at a first time on the time axis and a second pixel height at a second time on the time axis, said first pixel height being different from the second pixel height; and
wherein said one or more shot boundaries are identified in a source video comprised of said multiple frames, and said one or more shot boundaries are identified based at least in part on a determination that a entropy histogram for one or more particular frames of said multiple frames has a value greater than a threshold entropy value.

28. The method of claim 27, wherein said slice across multiple frames a video cube comprises a diagonal slice of said video cube.

29. The method of claim 28, and further comprising:
blocking one or more videos from distribution based at least in part on said matching.

30. The method of claim 28, and further comprising:
licensing one or more videos based at least in part on said matching.

31. The method of claim 27, wherein said video fingerprint comprises a feature vector based at least in part on said image slice.

32. The method of claim 31, wherein said feature vector comprises a color correlogram based at least in part on said image slice.

33. A system comprising:
means for generating one or more video cubes corresponding to one or more portions of a source video comprised of multiple frames;
means for identifying one or more shot boundaries in said source video, wherein said one or more shot boundaries are identified based at least in part on a determination that a entropy histogram for one or more particular frames of said multiple frames has a value greater than a threshold entropy value;
means for slicing said one or more video cubes across said multiple frames at least in part to generate one or more corresponding image slices, wherein said one or more shot boundaries forms at least one edge of said one or more video cubes, said one or more video cubes comprising a time axis, where said one or more corresponding image slices has a first pixel height at a first time on the time axis and a second pixel height at a second time on the time axis, said first pixel height being different from the second pixel height; and
means for generating a video fingerprint corresponding to said video based at least in part on the slice across multiple frames of said one or more video cubes.

34. The system of claim 33, wherein said means for slicing the one or more video frames across multiple frames is further capable of diagonally slicing the one or more video cubes.

35. The system of claim 33, and further comprising:
means for matching one or more video based at least in part on corresponding video fingerprints.

36. The system of claim 35, and further comprising:
means for blocking one or more videos based at least in part on said matching.

37. The system of claim 35, and further comprising:
means for licensing one or more videos based at least in part on said matching.

* * * * *